(12) United States Patent
Emerson

(10) Patent No.: US 8,047,923 B2
(45) Date of Patent: Nov. 1, 2011

(54) SPLIT RETHREADING DIE

(76) Inventor: John M. Emerson, College Corner, OH (US)

( * ) Notice: Subject to any disclaimer, the term of this patent is extended or adjusted under 35 U.S.C. 154(b) by 517 days.

(21) Appl. No.: 12/156,342

(22) Filed: May 30, 2008

(65) Prior Publication Data
US 2009/0298600 A1 Dec. 3, 2009

(51) Int. Cl.
*B21J 13/02* (2006.01)
(52) U.S. Cl. .......................... 470/185; 470/67
(58) Field of Classification Search .............. 470/10, 470/66, 67, 185, 187, 190, 80; 408/215, 408/216, 221; 411/432; 269/287, 288; 72/467
See application file for complete search history.

(56) References Cited

U.S. PATENT DOCUMENTS

| | | | | |
|---|---|---|---|---|
| 300,604 A * | 6/1884 | Hartmann | ...................... | 408/120 |
| 739,873 A * | 9/1903 | Howe | ........................... | 408/142 |
| 888,563 A | 5/1908 | Wilkins | | |
| 1,416,059 A | 5/1922 | Piel | | |
| 1,564,591 A * | 12/1925 | Lansche | ........................... | 76/117 |
| 1,576,166 A * | 3/1926 | Wells | ........................... | 408/156 |
| 1,625,830 A * | 4/1927 | Smith | ........................... | 408/180 |
| 1,803,888 A | 9/1928 | Basola et al. | | |
| 1,857,493 A * | 5/1932 | Campaigne | ...................... | 408/215 |
| 1,951,581 A | 11/1932 | Smith et al. | | |
| 4,132,146 A * | 1/1979 | Uhlig | ........................... | 411/433 |
| 4,346,491 A | 8/1982 | Kraus et al. | | |
| 4,572,032 A | 2/1986 | Kinzler | | |
| 4,657,458 A * | 4/1987 | Wollar et al. | ................. | 411/182 |
| 4,872,790 A | 10/1989 | Sibole | | |
| 5,288,181 A | 2/1994 | Pinkston | | |
| 5,803,676 A | 9/1998 | Wienss | | |
| 6,206,620 B1 | 3/2001 | Burns | | |
| 7,338,246 B2 * | 3/2008 | Caspi | ........................... | 411/432 |

* cited by examiner

*Primary Examiner* — Edward Tolan
(74) *Attorney, Agent, or Firm* — MacCord Mason PLLC

(57) ABSTRACT

A rethreading die for clamping over a section of threaded rod is formed of two separable identically die section halves. Each die section has one-half of an outer gripping surface and an inner abutment face formed of identically shaped spaced first and second face sections in a common plane. One face section has a perpendicular alignment pin and the second face section has a perpendicular recess. The first and second faces are spaced and in a common plane. The die sections are joined together with the pin-containing face of each die section abutting the recess-containing face of the other die section so that the pins are inserted into the recesses to hold the die sections in alignment. A die tool is then clamped around the die surface, so that the die can be rotated over the damaged rod section to repair the threads.

14 Claims, 1 Drawing Sheet

SPLIT RETHREADING DIE

BACKGROUND OF THE INVENTION (1) Field of the Invention

The present invention relates to a die for use in rethreading or chasing threads on a stud, bolt or rod with a damaged area, and in particular to a simple to manufacture, easily aligned, two-section die that can be clamped above the damaged area.

(2) Description of the Prior Art

Studs, bolts and other threaded rods, referred to collectively herein as rods, are commonly rethreaded with a hexagonal rethreading die to repair thread damage. A normal rethreading die has a central opening with cutting or threading teeth facing into the opening for thread forming or cutting. The opening also includes relief areas to permit cuttings or debris to fall away from the area of the rod being repaired and to lubricate the teeth and rod.

In those instances where there is a need to repair a rod having damage at or near its unattached end, threading of a normal die onto the rod to repair the threads can be difficult or impossible to properly alignment the die threads to the thread pitch of the rod. In order to rethread rods with thread damage at or near the rod end, split or multi-section dies have been developed.

A split die is comprised of two or more sections that are joinable together to form the hexagonal rethreading die. More particularly, a two-section rethreading die is comprised of a pair of opposed die members cooperatively defining an inner opening and thread forming surfaces facing into the opening. The die members further define external wrench surfaces which together have a hexagonal surface.

This construction permits separation of the die sections so that the die can be positioned around an undamaged inboard part of the rod above the damaged section. After positioning around the rod, the die sections are clamped together with a socket wrench or other suitable tool and the die is rotated outwardly toward the segment with the damaged threads. For example, if the rod has right-hand threads, the die is rotated counterclockwise. As the die is rotated over the damaged segment, the threads are reformed by the die threads.

Several prior art patents describe split rethreading dies. For example, U.S. Pat. No. 4,572,032 to Kinzler describes a hinged split die comprised of two die sections that are hinged together at one side to form a clam shell type die that opens for placement around the rod. An adjustable screw on the other side of the die controls the distance of separation between the die sections when the sections are closed. U.S. Pat. No. 6,206,620 also describes a hinged die comprised of two identical die segments that are hinged together.

U.S. Pat. No. 4,346,491 to Kraus et al. and U.S. Pat. No. 5,803,676 to Wienss describe rethreading dies comprised of two sections that are clamped together by special clamping tools. U.S. Pat. No. 1,416,059 to Piel describes a rethreading die, in which the die sections are held together by a circular spring. While not specifically described as a rethreading die, U.S. Pat. No. 1,366,884 describes a sectional nut comprised of two nut sections that are hinged together at one side. A register pin is used to align the sections on the opposite side and a flexible leaf spring is used to hold the nut sections together.

While the above dies are known in the prior art, there is still a need for a two-section replacement die that is economical to manufacture and which can be quickly and easily clamped around a rod having a damaged thread segment, particularly when the rod is in a confined location making opening of a hinged two-section die difficult or impossible.

SUMMARY OF THE INVENTION

The present invention addresses this need by providing a replacement die comprised of two identical die sections that can be quickly and accurately joined together to form the complete replacement die.

More specifically, each die segment includes first and second inner faces that lie in a common plane and which are separated by a hemispherical internal threaded area with one complete relief area and two halves of relief areas adjacent each face. These gaps not only provide an area for the accumulation and fallout of any cut material from the damaged bolt or stud, but more importantly allow for the introduction of lubricant during the repair process.

To facilitate clamping of the die, each die section includes two clamping surfaces and two clamping surface halves. When joined together, the clamping surfaces form a hexagon, with the surface halves of the two dies joining together to form a complete die surface.

One face of each die includes an outwardly extending alignment pin, while the other face of each die includes a pin recess to receive the alignment pin. The faces of the die sections abut the faces of the other with the alignment pin of each die section being inserted into the alignment pin recess of the other. Preferably, the pin recess extends partially through the die section from the die face, with a relief channel extending from the bottom of the recess to the opposed clamping surface to exhaust air from the recess and facilitate cleaning. Preferably, the diameter of the recess is greater than the diameter of the relief channel.

An identical recess and relief channel can be provided on the opposite face of each die section with the recesses being located at the same position on each face. The alignment pin, having a cross-sectional area equal to the cross-sectional area of the recess is then snugly inserted into the recess on the opposite face. Preferably, the recess has a circular cross-section for ease of pin orientation.

Thus, the invention defines a rethreading die that can be clamped over a section of threaded rod having a damaged area and rotated to repair the damaged area comprising a first die section having one-half of an outer gripping surface and an inner abutment face formed of identically shaped spaced first and second face sections in a common plane, the first face section having a first perpendicular alignment pin and the second face section having a first recess perpendicular to the second face; and a second die section identical to the first die section, having one-half of an outer gripping surface and an inner abutment face formed of identically shaped spaced second and third face sections in a common plane, the third face section having a second perpendicular alignment pin and the fourth face section having a second recess perpendicular to the fourth face, whereby the die sections form the rethreading die when the first face abuts the fourth face with the first alignment pin extending into the second recess and the second face abuts the third face with the second alignment pin extending into the first recess.

When using the split die of the present invention to repair damaged rod threads, a first die section is positioned against the rod above the damaged area, i.e., opposite the damaged area from the rod end, with the die section threads meshing with the rod threads. The second die section, oriented 180° from the first die section, is positioned on the opposite side of the rod from the first die section with the pin of the first die section being inserted into the second die section recess, and the pin of the second die section being inserted into the first die section recess.

A socket wrench or other suitable tool adapted to engage a hexagonal surface is then clamped onto the die sections to hold the die sections together and firmly against the rod. The die is then rotated toward the distal end of the rod with the tool, engaging and repairing the damaged threads. The die can then be unclamped and removed after the damaged section has been repaired or after it is rotated beyond the end of the bolt.

Various other features, objects, and advantages of the present invention will be made apparent from the following detailed description and the drawings.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
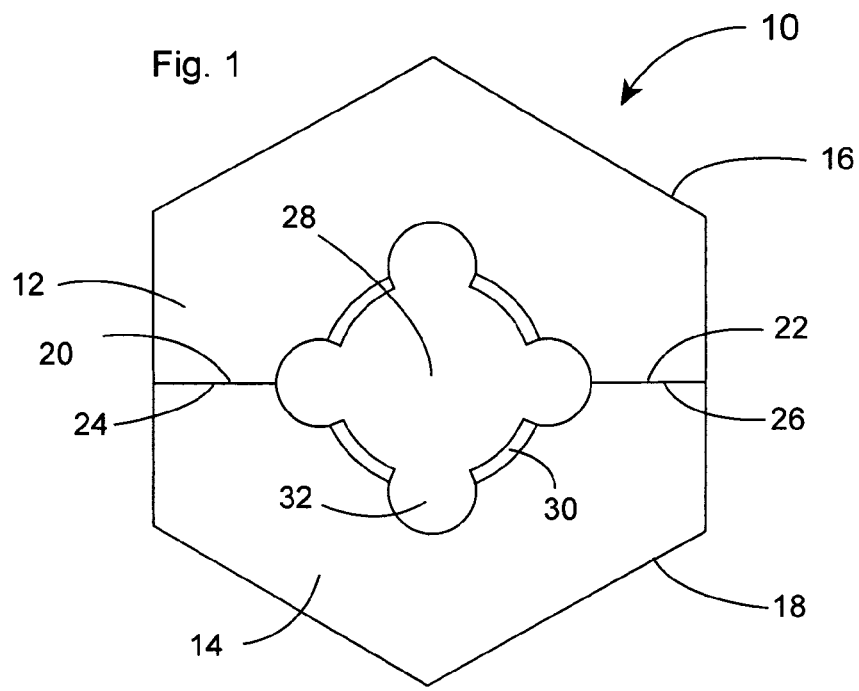
FIG. 1 is a top view of a preferred embodiment of the split die.
Figure 2:
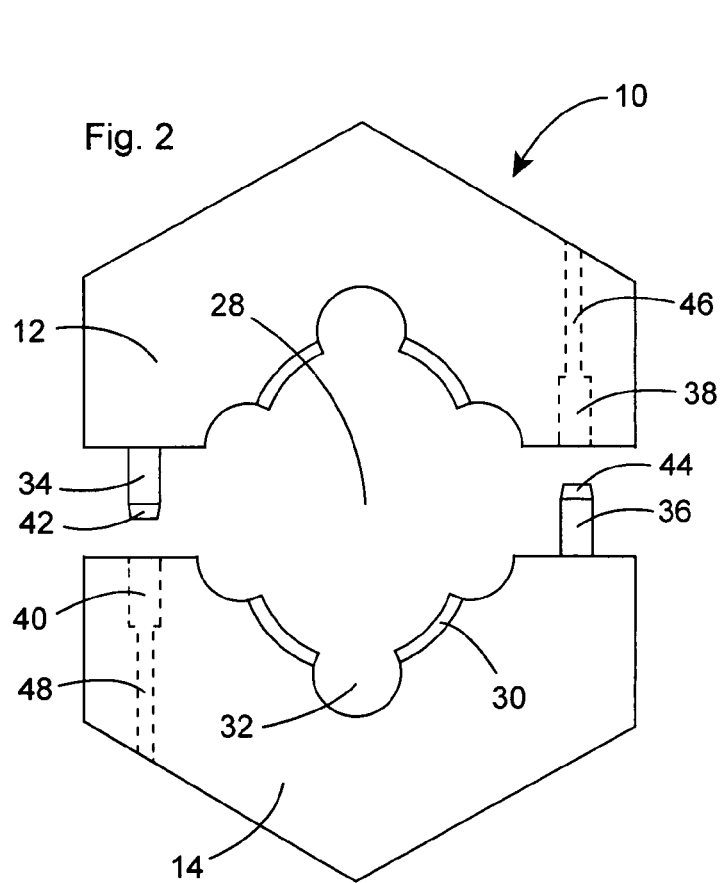
FIG. 2 is an exploded top view of the split die.
Figure 3:
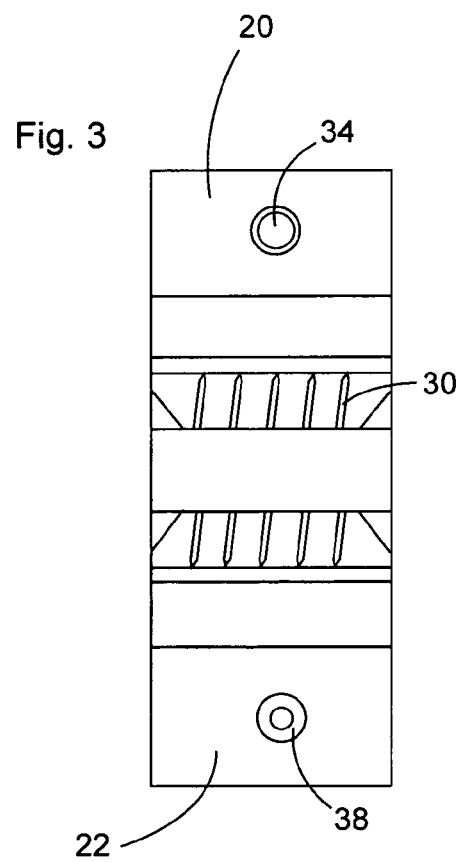
FIG. 3 is a sectional inner side view of one half of the split die.

As illustrated, a preferred embodiment of the split die, generally 10, is comprised of identical sections 12 and 14, which are oriented with one section oriented 180° from the other for joinder to form the complete die. For purposes of description, FIG. 3 illustrates the inner face of die section 12. It will be understood, however, that the inner face of die section 14 is identical.

Die section 12 includes an outer gripping surface 16 which, in combination with gripping surface 18 of die section 14, is shaped for gripping by a hand tool (not shown) used to turn die 10 in either a clockwise or counterclockwise direction while holding die sections 12 and 14 together. Die section 12 also includes inner faces 20 and 22, which are in a common plane and extend inwardly from the opposite sides of the surface of die section 12. Faces 20 and 22 are adapted to abut corresponding faces 24 and 26 of die section 14 when the sections are joined together to form completed die 10.

The center of die 10 includes a cylindrical through bore 28 with four sets of cutting teeth 30 projecting radially inwardly toward the center axis of die 10. Teeth sets 30 are separated by discharge grooves 32 which are used to lubricate teeth 30 and permit discharge of shavings and debris. One-half of bore 28, two of teeth sets 30, one complete groove 32 and halves of two other grooves 30 are in each die section. When joined, the groove halves of each section fit together to form complete grooves.

In order to ensure proper alignment of die sections 12 and 14, face 20 of die section 12 includes an outwardly projecting alignment pin 34, perpendicular to face 20. Similarly, face 24 of die section 14 includes an outwardly projecting alignment pin 36, perpendicular to face 24. Face 22 of die section 12 includes a recess 38 sized to snugly receive pin 36 of die section 14 and face 26 of die section 14 includes a recess 40 sized to snugly receive pin 34 when the die sections faces abut.

Pins 36 and 38 preferably include tapered distal ends 42 and 44, respectively, to facilitate insertion of pins 36 and 38 in recesses 38 and 40, respectively. Recesses 38 and 40 preferably include through bores 46 and 48, respectively, extending from the bottom of the recesses to the die section surfaces to facilitate pin insertions and cleaning of the recesses if required.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A two-section rod rethreading die comprising:
 a) a first die section having one-half of an outer gripping surface, a first face, a second face with a first recess perpendicular to said second face, said first and second faces being spaced and in a common plane, said first die section further including a first outwardly projecting alignment pin perpendicular to said first face; and
 b) a second die section identical to said first die section, said second die section having one-half of an outer gripping surface, a third face, a fourth face with a second recess perpendicular to said fourth face, said third and fourth faces being spaced and in a common plane, said second die section further including a second outwardly projecting alignment pin perpendicular to said third face, whereby said die sections form said rethreading die when said first face abuts said fourth face with said first alignment pin extending into said second recess and said second face abuts said third face with said second alignment pin extending into said first recess.

2. The die of claim 1, wherein each of said die sections includes one-half of a cylindrical rod receiving through bore with radically inwardly extending cutting thread sets.

3. The die of claim 2, wherein each of said die sections includes two sets of cutting threads.

4. The die of claim 1, wherein each of said die sections includes one complete discharge groove and two discharge groove halves, the groove halves of the die sections being abuttable to form two complete discharge groove, whereby the die includes four discharge grooves.

5. The die of claim 1, wherein the combined surfaces of said die sections have a hexagonal cross-section.

6. The die of claim 1, wherein each of said die sections includes a through bore extending from its pin recess to its gripping surface.

7. The die of claim 1, wherein the distal ends of said pins are tapered.

8. A rethreading die that can be clamped over a section of threaded rod having a damaged area and rotated to repair the damaged area comprising:
 a) a first die section having one-half of an outer gripping surface and an inner abutment face formed of identically shaped spaced first and second face sections in a common plane, said second face section having a first recess perpendicular to said second face, said first die section further including a first outwardly projecting alignment pin perpendicular to said first face; and
 b) a second die section identical to said first die section, having one-half of an outer gripping surface and an inner abutment face formed of identically shaped spaced second and third face sections in a common plane, said fourth face section having a second recess perpendicular to said fourth face, said second die section further including a second outwardly projecting alignment pin perpendicular to said third face, each of said die sections includes a through bore extending from its pin recess to its gripping surface whereby said die sections form said rethreading die when said first face abuts said fourth face with said first alignment pin extending into said second recess and said second face abuts said third face with said second alignment pin extending into said first recess.

9. The die of claim 8, wherein each of said die sections includes one-half of a cylindrical rod receiving through bore with radically inwardly extending cutting thread sets.

10. The die of claim 9, wherein each of said die sections includes two sets of cutting threads.

11. The die of claim 8, wherein each of said die sections includes one complete discharge groove and two discharge groove halves, the groove halves of the die sections being abuttable to form two complete discharge groove, whereby the die includes four discharge grooves.

12. The die of claim 8, wherein the combined surfaces of said die sections have a hexagonal cross-section.

13. The die of claim 8, wherein the distal ends of said pins are tapered.

14. The die of claim 8 wherein said pins and recesses are centrally located on their respective faces.

* * * * *